Dec. 16, 1969  K. RAY  3,483,901
ELECTRIC POWER SAW MITER MACHINE
Filed Dec. 12, 1967  2 Sheets-Sheet 2
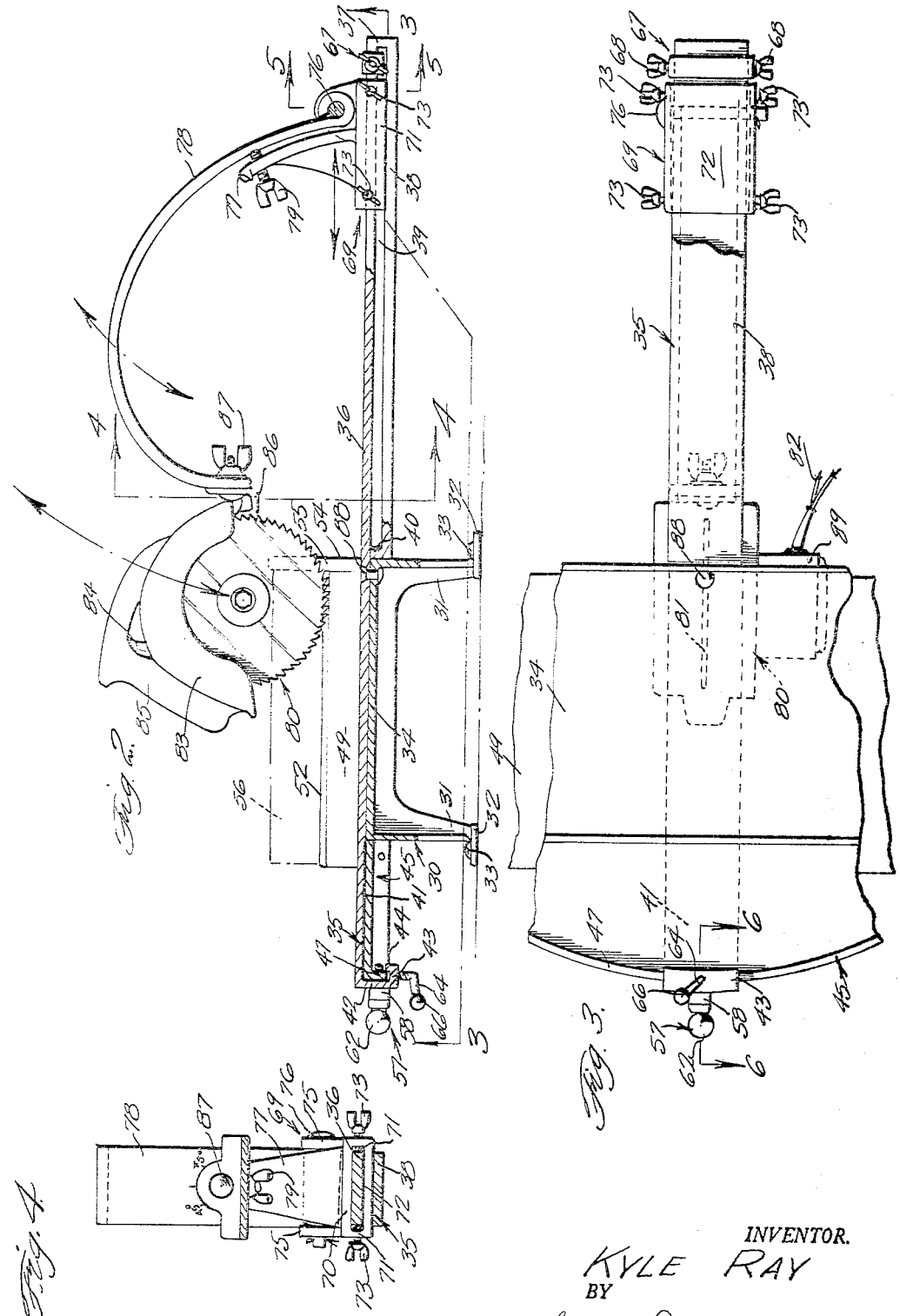
INVENTOR.
KYLE RAY
BY
Sherman Levy
HIS ATTORNEY United States Patent Office 3,483,901
Patented Dec. 16, 1969

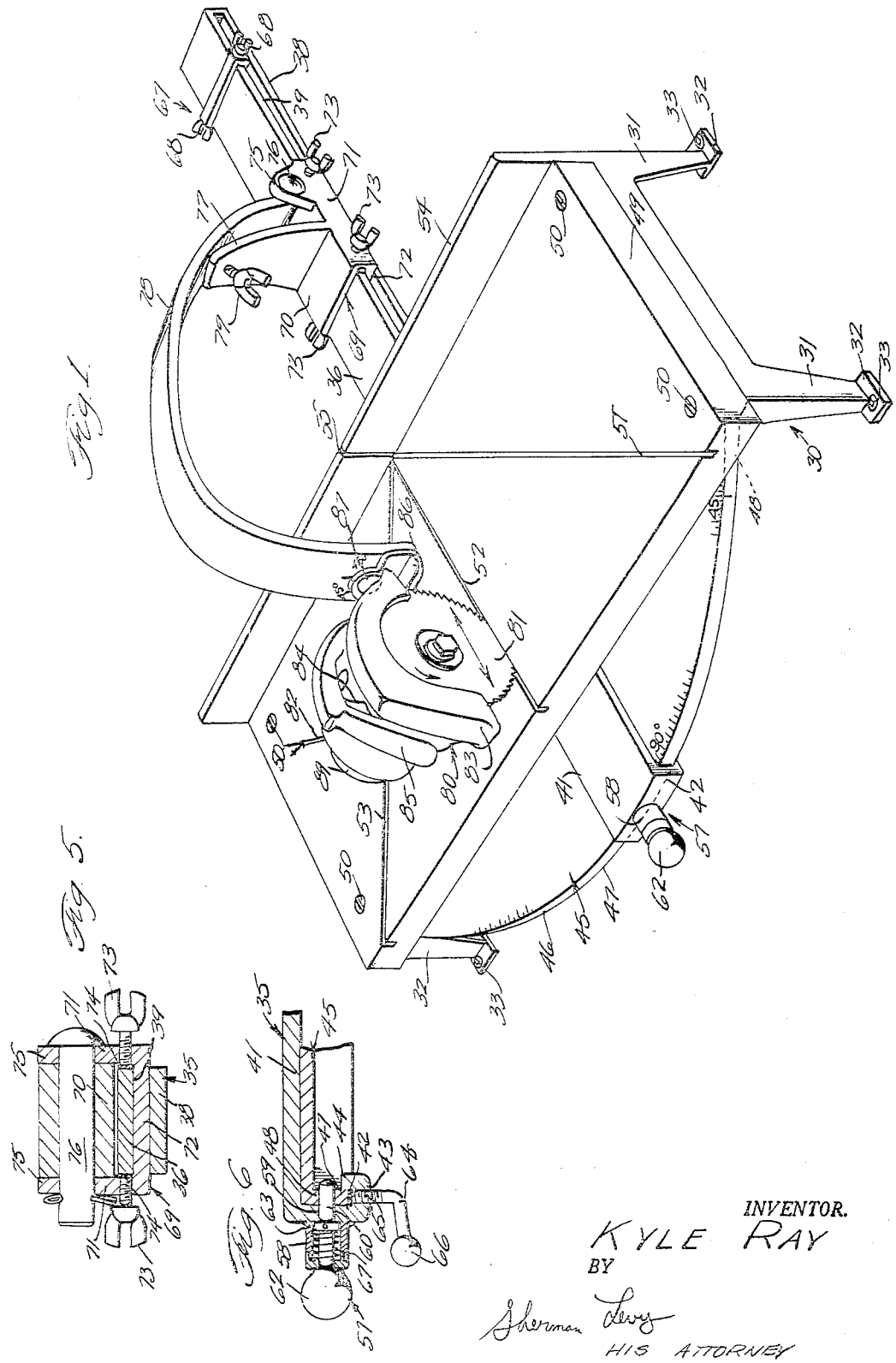

3,483,901
ELECTRIC POWER SAW MITER MACHINE
Kyle Ray, 4815 Oglethorpe St., Riverdale, Md. 20840
Filed Dec. 12, 1967, Ser. No. 690,013
Int. Cl. B27b 27/06
U.S. Cl. 143—6                                    2 Claims

ABSTRACT OF THE DISCLOSURE

A miter box or machine having a power operated saw for cutting workpieces, and having a means for permitting various adjustments and cuts in workpieces to be made. A table supports the workpieces and an elongated support member is pivoted to the table for adjusting the miter angle. The power saw is tiltably attached to an arcuate holder to permit beveling and the holder is swingably mounted at the end opposite the saw to a frame which is slidable on the elongated support member. The frame is provided with an adjustable stop which limits the downward swinging of the saw and governs the depth of cut as the saw by reason of the slidable frame moved over the table.

BACKGROUND OF THE INVENTION

Field of the invention

The present invention relates to the field of Wood Sawing, Class 143, subclasses 6, 46, 86, 88, 160 and 167, and Class 144, subclass 216.

Description of the prior art

The prior art includes the following prior patents: 2,513,497; 2,842,168; 2,911,017; 3,139,124; 3,275,044; 3,285,303; 3,327,742; 3,344,819; 3,344,824.

Some of the differences or advantages that the present invention has over these prior patents is as follows:

The present invention is safe and efficient to use and the user can see the blade as well as the cuts on the workpiece or wood being made, and the present invention is a tool, not a jig. There are no complicated parts in the construction, and the present invention is inexpensive to manufacture and ruggedly constructed and easy to operate.

SUMMARY OF THE INVENTION

In accordance with the present invention, there is provided a miter box or miter machine which includes a support, a means for adjustably mounting a power saw so that cuts can be made at different angles or positions as desired or required and wherein there is provided scale markings or graduations so that the parts can be accurately located or positioned, and wherein there is provided a novel locking means for maintaining the parts stationary or immobile in various adjusted positions.

BRIEF DESCRIPTION OF THE DRAWINGS

FIG. 1 is a perspective view of the electric miter box or miter machine of the present invention.

FIG. 2 is a side elevational view with parts broken away and in section.

FIG. 3 is a bottom view taken on the line 3—3 of FIG. 2.

FIG. 4 is a sectional view taken on the line 4—4 of FIG. 2.

FIG. 5 is a sectional view taken on the line 5—5 of FIG. 2.

FIG. 6 is a sectional view taken on the line 6—6 of FIG. 3.

Attention is directed to the drawings wherein the numeral 30 indicates a table that includes a plurality of spaced parallel vertically disposed legs 31 which may have portions 32 on their lower ends that can be suitably secured or affixed to a supporting element or structure by means of securing elements 33. The table 30 further includes a horizontally disposed top member 34, FIG. 2.

As shown in the drawings, there is provided an elongated support member 35 which includes a major portion thereof that is mounted on the table 30, and the support member 35 includes a rearwardly disposed first horizontally disposed portion 36 as well as a vertically disposed second portion 37 at the rear of the first portion 36. The supporting member 35 further includes a horizontally disposed third portion 38 and the portions 38 and 36 coact to define or provide a space 39 therebetween for a purpose to be later described. The third portion 38 has on its front end a vertically disposed fourth portion 40 which may be suitably secured as by welding to the first portion 36, FIG. 2. The support member 35 further includes a horizontally disposed forwardly arranged fifth portion 41 having on its front end a downwardly disposed sixth portion 42 which has secured thereto or formed integral with the lower end horizontally disposed seventh portion 43, and the portion 43 terminates in an upwardly disposed eighth portion 44.

The numeral 45 indicates a body member which may be suitably secured to or formed integral with the upper front portion of the table 30 and the body member 45 has an arcuate front edge 46 as shown in the drawings. The numeral 47 indicates a downwardly extending lip on the front portion of the body portion 45 and the lip 47 is received snugly in the space between the portions 42, 43 and 44 of the support member 35, and the lip 47 is adapted to have a plurality of spaced apart openings 48 therein. There is further provided a horizontally disposed base piece 49 which is mounted on the table 30 above the support 35, and the base piece 49 may be affixed to the top member 34 in any suitable manner as, for example, by means of securing elements 50. The base piece 49 is adapted to have a plurality of grooves 51, 52 and 53 therein as shown in the drawings. The numeral 54 indicates a vertically disposed flange on the rear portion of the table 30, and the flange 54 has a slot 55 intermediate its ends and the slot 55 coincides with or registers with the rear portions of the grooves 51, 52 and 53. The base piece 49 is adapted to have a workpiece 56 (broken lines, FIG. 2) supported thereon, and the workpiece 56 may consist of a piece of wood or other material to be cut. The numeral 57 indicates a locking mechanism which comprises a bushing 58 that is affixed to the front end of the portion 42 of the support member 35, and the portion 42 has an aperture or opening therein for the projection therethrough of a locking pin 60 and the pin 60 is adapted to engage one of the openings 48 in the lip 47. A coil spring 61 is circumposed on the pin 60 within the bushing 58 for engaging a collar 63 that is secured on the pin 60 whereby the pin 60 will be biased or urged into locking relationship with the registering openings, and the pin 60 has on its outer end a knob 62 for facilitating manipulation of the locking mechanism 57, FIG. 6.

There is further provided a locking bar 64 which has a threaded portion 65 threadedly or adjustably engaging a suitable aperture in the portion 43 of the support member 45, and the upper end of the locking bar 64 is adapted to engage the lower surface of the lip 47 which has a manually operable handle 66 thereon.

The numeral 67 indicates a stop member which is adjustably mounted on the rear portion of the support member 35, and the securing elements 68 are connected to the sides of the stop member 67 for engaging the side edges of the portion 36 in order to maintain the stop member 67 immobile in its various adjusted positions.

As shown in the drawings there is provided a frame piece 69 which is adjustably connected to the support member 35, and the frame piece 69 includes a top portion 70 which is arranged upon the portion 30 with depending vertically disposed side sections 71 which have a horizontally disposed bottom section 72 depending therebetween and the bottom section 72 is arranged in the space 39 between the portions 36 and 38. Manually adjustable securing elements such as bolts or screws extend through suitable threaded apertures in the sides 71 and engage bearing strips 74 which may be made of a suitable material such as nylon, FIG. 5. Secured to the upper portion of the frame piece 69 or formed integral therewith are upstanding spaced parallel lugs 75 which have a pivoting pin 76 extending therebetween, and the numeral 78 indicates a generally arcuate holder or bracket which has an end portion thereof pivotally connected to the pin 76. The numeral 77 indicates a bracket which is affixed to the upper portion of the frame piece 69, and there is provided a manually adjustable securing element 79 which extends through a suitable threaded opening in the bracket 77 for selective engagement with the holder 78.

The numeral 80 indicates a conventional power saw which includes a rotary blade 81 driven by a motor 89, and the motor 89 may be connected to a suitable source of electrical energy by means of wires or conductors 83. The saw 80 may include trigger 84, the usual dust guard 83, and handle 85. The saw 80 has a mounting member 86 which is pivotally or swingably connected to an end portion of the holder 78 by means of a pivot pin or securing element 87, as shown in FIG. 2. The numeral 88 indicates a pivot pin for pivotally connecting the support member 35 to the top member 34 of the table 30.

From the foregoing, it will be seen that there has been provided a miter box or machine, and in use with the parts arranged as shown in the drawings a workpiece such as the piece of wood 56 which is to be cut is adapted to be supported on the base piece 49 and is arranged in the desired location and then, with the parts adjusted in the desired manner, and with the saw 80 connected to a source of electrical energy by wires or conductors 83 it will be seen that the workpiece 56 can be cut in the desired manner. The grooves 51, 52 and 53 in the base piece 49 provide clearance for the rotary saw blade 81, so that as the saw blade cuts through the wood or workpiece 56 these grooves will permit the saw blade to operate in the desired manner. In addition, the flange 54 on the rear of the table 30 has the slot 55 in the intermediate portion thereof so that, as shown in FIG. 2 for example, the saw blade 81 can operate through this slot 54 to make a complete cut through the wood 56.

The stop member 67 can be adjusted to the desired location on the support member 35, and to adjust the stop member 67 it is only necessary to loosen the bolts 68 whereby the stop member 67 can be moved to the desired location and then the bolts or securing elements 68 can be readily manually tightened so that the stop member 67 will limit movement of the parts such as the parts that support the power saw.

In addition, the frame piece 69 can be adjusted by first loosening securing elements 73 whereby the frame piece 69 can be moved to the desired location on the support member 35 and then the securing elements 73 are adapted to be tightened so that the frame piece 69 and the associated parts will be stationary in their desired adjusted position. The securing element 79 which extends through the bracket 77 is adapted to abut or engage a portion of the holder 78 as shown in FIGS. 1 and 2 so as to provide a further means for maintaining the holder 78 in the desired location and by adjusting the rotating or securing element 79 the location or position of the holder 78 which carries the power saw can be adjusted about an axis that extends through the pivot pin 76. This adjustment screw 79 provides a means whereby the depth of cut in the workpiece can be controlled in the desired manner.

There is provided a means for permitting the saw blade to be tilted, and this means includes the pivot mounting element 87 which can be loosened so as to permit the entire saw to pivot about the securing element 87, and the securing element 87 is then adapted to be tightened so that the saw blade will make cuts of any desired angle in the workpiece or wood 56.

Also, there is provided a locking means for maintaining certain of the parts stationary in their desired position. As previously stated, the support member 35 is pivotally connected to the table top 34 by means of a pivot pin 88, so that when it is desired to adjust the position of the saw so that, for example, a cut is to be made along the groove 51 or 53 or an intermediate position it is only necessary to actuate the locking mechanism. This locking mechanism is shown in detail in FIGS. 1, 2, 3 and 6. In releasing the locking mechanism 57 it is only necessary to pull out on the knob 62, and this will free the pin 60 from the aperture 48 in the lip 47 of the body member 45 so that the support member 35 can be pivoted about an axis extending about the pin 88 and then when the parts have been moved to their desired location, manual pressure on the knob 62 can be released so that the coil spring 61 will urge or bias the pin 60 through the openings 59 and 48 to maintain the support member and associated parts stationary and in their desired location. Also, by manually loosening the locking bar 64 by means of the knob 66 the upper end of the locking bar 64 can be moved out of engagement with the surface of the lip 47, and after the parts have been moved to their desired location the locking bar 64 can be moved to maintain the parts stationary.

It is to be understood that the parts can be made of any suitable material and in different shapes or sizes as desired.

The present invention cross cuts and miters various types of materials such as baseboard, light weight aluminum and plastic, and wherein the present invention is ruggedly constructed and light in weight. The slotted arrangement provides clearance for sawdust to pass through. The present invention can also be used for cutting trim, and the saw can be raised up high enough to clear molding and wherein a clean cut can be provided with no splinters and cutting can be accomplished quickly and efficiently. Various types of cuts such as 45 degree angles can be made and the various common cuts such as 30, 45 angle cuts and the like can also be accomplished. Various accessories can be used, and the saw can be tilted to get a bevel cut. Boards of various size, thickness or width can be cut, and the present invention is a miter box used for trim or the like and is especially suitable for residential work, and wherein the present invention will also permit various types of workpieces such as those used in making closets, staircases and the like to be trimmed or cut and also cross cutting to be readily accomplished.

The saw can also be used for making grooves and dado blades can be used and rabbets can be cut out. For the usual adjustments the locking mechanism 57 is actuated, but for intermediate angled positions the locking bar 64 is used; otherwise the locking bar 64 is not utilized. A stop member in the nature of a resilient grommet can be used so that when the holder 78 is flipped over the grommet will act as a stop member. The table 30 can be bolted or otherwise secured to a suitable bench or the like. It can be provided with scale markings so that the device can be accurately adjusted or aligned. The nylon bearing strips 74 help prevent undue wear on the parts. The present invention can be used by home owners, craftsmen and the like as well as by persons engaged in commercial activities.

An important aspect or feature of the present invention is the provision of an electric miter box or an electric miter machine which is efficient in operation and low in cost, and wherein the present invention is suitable for an 8" saw although it is not limited to such a size saw. Rapid adjustment can be made by manually releasing the locking member 57, whereas other adjustments can be made by actuating the locking bar 64. The present invention has improved safety features because of its unique construction and because a pushing movement is utilized for cross cuts so that the user is working in a straight movement. Also, when the blade 81 starts to wear down wherein the blade gets smaller, the wing nut 79 can be adjusted to compensate for this wear by permitting the saw blade to occupy a lower position. Also, with the present invention a person can cut bevel cuts on thin pieces of wood or square cuts on thick wood, and the present invention can be made of a light weight material such as aluminum, and the present invention is easy to operate and easy to adjust. The user can observe the blades as well as the cuts on the piece of wood. The present invention is a tool and is not a jig, and various types of saws can be merchandised for the present invention. Also, the device is constructed so that a complete cut can be made through the wood or other material, and long pieces of wood can be cut as well as pieces of wood such as picture frames. The present invention is also adapted to be used by contractors or persons in work shops, and wherein the device can be used as a saw. An indicator or scale markings can be used for accurately setting the saw for tilt. The securing elements 73 can be tightened to take up play to prevent the blade from wobbling and in order to secure a true cut. The securing elements adjust for depth of cut. The nylon strips 74 do not require lubrication and will not readily wear out. The pivot 87, FIG. 4, permits adjustment of the saw for angle cuts. The saw can be operated and with the blade turning the blade can be lowered so that it passes right through the wood.

Since certain changes cay be made in the above apparatus without departing from the scope of the invention herein involved, it is intended that all matter contained in the above description or shown in the accompanying drawings shall be interpreted as illustrative and not in a limiting sense.

What is claimed is:

1. In an electric miter box, a table including a plurality of vertically disposed legs, a horizontally disposed top member affixed to the upper portion of said legs, an elongated horizontally disposed support member mounted on said top member, said support member having a rearwardly disposed first portion, a vertically disposed second portion at the rear of the first portion, a horizontally disposed third portion arranged in spaced parallel position to said first portion, and said first and third portions coacting to define a space therebetween, a vertically disposed fourth portion, and said fourth portion being secured to said first portion, said first member further including an horizontally arranged fifth portion having a downwardly extending sixth portion terminating in a horizontally disposed seventh portion which has an upwardly disposed eighth portion thereon; a body member affixed to the upper front portion of said table and said body member having an arcuate front edge thereon, a downwardly extending lip received in the space between the eighth and sixth portions of said support member, said lip having a plurality of spaced apart apertures mounted therein, a base piece mounted on said top member and said base piece being affixed to said top member and said base piece having a plurality of grooves therein; a vertically disposed flange on the rear portion of said table and said flange having a slot therein intermediate its ends coinciding with the rear portions of the grooves, and said base piece having a workpiece supported thereon, a locking mechanism comprising a bushing affixed to the front end of said support member, there being an opening in said sixth portion of said support member, a pin movably mounted and adapted to selectively engage one of the openings in said lip, a coil spring on said pin, a manually operable knob on the outer end of said pin; a locking bar threadedly, adjustably engaging the seventh portion of said support member and being provided with a manually operable member thereon; a stop member adjustably mounted on the rear portion of said support member and securing elements being connected for engaging said support member, a frame piece adjustably connected to said support member and said frame piece comprising a top section arranged above said support member, vertically disposed side sections depending from said top section, a horizontally disposed bottom section extending between said side sections and said bottom section being movably mounted between the first and third portions of said support member; manually adjustable securing elements extending through the side sections of said frame piece, bearing strips interposed between said frame piece and the first portion of said support member; upstanding spaced parallel lugs secured to the upper portion of said frame piece, a pivot pin extending between said lugs, an arcuate holder having one end pivotally connected to said pin, a bracket affixed to the upper portion of said frame piece and having a manually adjustable securing element for selectively engaging said holder; a power saw having a portion arranged contiguous to the free end of said holder and pivotally connected thereto, and a pivot pin connecting said support member to the top member of said table.

2. The structure as defined in claim 1, wherein said support member can be pivoted relative to the top member and base piece.

References Cited

UNITED STATES PATENTS

| | | |
|---|---|---|
| 794,737 | 7/1905 | Peer. |
| 3,105,528 | 10/1963 | Loughridge. |
| 3,139,124 | 6/1964 | Hoff. |
| 3,344,824 | 10/1967 | Greco. |

DONALD R. SCHRAN, Primary Examiner

U.S. Cl. X.R.

143—46, 47